(12) United States Patent
Gandhi et al.

(10) Patent No.: US 10,723,447 B2
(45) Date of Patent: Jul. 28, 2020

(54) SUSPENSION FOR LANDING CONDITION

(71) Applicant: Toyota Motor Engineering & Manufacturing North America, Inc., Erlanger, KY (US)

(72) Inventors: Umesh N. Gandhi, Farmington Hills, MI (US); Matthew C. Clontz, Blacksburg, VA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 471 days.

(21) Appl. No.: 15/453,527

(22) Filed: Mar. 8, 2017

(65) Prior Publication Data

US 2018/0257764 A1    Sep. 13, 2018

(51) Int. Cl.
*B64C 25/58*    (2006.01)
*B64C 37/00*    (2006.01)

(52) U.S. Cl.
CPC .............. *B64C 25/58* (2013.01); *B64C 37/00* (2013.01)

(58) Field of Classification Search
CPC ..... B64C 25/58; B64C 25/32; B64C 2201/18; B64C 37/00; B60F 5/02; F16F 7/1034
See application file for complete search history.

(56) References Cited

U.S. PATENT DOCUMENTS

| | | | | |
|---|---|---|---|---|
| 4,801,155 A | * | 1/1989 | Fukushima | B60G 17/015 180/41 |
| 4,881,700 A | * | 11/1989 | Sarh | B60F 5/02 244/2 |
| 5,836,541 A | * | 11/1998 | Pham | B60F 5/02 244/2 |
| 5,984,228 A | * | 11/1999 | Pham | B64C 37/00 244/100 R |

(Continued)

OTHER PUBLICATIONS

Baker et al., "Passive Landing Gear using Coupled Mechanical Design", Proceedings of Australasian Conference on Robotics and Automation, Dec. 2-4, 2013, (8 pages), University of New South Wales, Sydney Australia.

(Continued)

*Primary Examiner* — Jessica B Wong
(74) *Attorney, Agent, or Firm* — Christopher G. Darrow; Darrow Mustafa PC

(57) ABSTRACT

An aerocar with a dual mode suspension system configured to operate in a roadable mode and a flight mode. The aerocar may include a front suspension assembly having a front axle, and a rear suspension assembly having a rear axle. A conduit system provides a hydraulic fluid in fluid communication between the front suspension assembly and the rear suspension assembly. An auxiliary hydraulic fluid reservoir is provided in fluid communication with the conduit system, and configured to selectively maintain or interrupt fluid communication between the front suspension assembly and the rear suspension assembly to adjust damping of the front (Continued)

suspension assembly. A controller may be provided, configured to direct the flow of hydraulic fluid from the rear suspension assembly to the front suspension assembly, for example, when a stroke of the rear suspension exceeds a predetermined value during landing.

18 Claims, 5 Drawing Sheets

(56) References Cited

U.S. PATENT DOCUMENTS

| | | | | |
|---|---|---|---|---|
| 6,086,014 | A * | 7/2000 | Bragg, Jr. | B64C 37/00 |
| | | | | 244/2 |
| 6,129,306 | A * | 10/2000 | Pham | B60F 5/02 |
| | | | | 244/2 |
| 6,131,848 | A * | 10/2000 | Crow | B64C 37/00 |
| | | | | 244/2 |
| 6,619,584 | B1 | 9/2003 | Haynes | |
| 9,868,520 | B1 * | 1/2018 | Winshtein | B64C 25/34 |
| 2008/0272561 | A1 * | 11/2008 | Monk | B60G 21/06 |
| | | | | 280/5.507 |
| 2011/0036939 | A1 * | 2/2011 | Easter | B60F 5/02 |
| | | | | 244/2 |
| 2013/0126666 | A1 * | 5/2013 | Brown | B60F 5/02 |
| | | | | 244/2 |
| 2014/0035256 | A1 * | 2/2014 | Zubieta Andueza | B62K 25/08 |
| | | | | 280/284 |
| 2015/0102155 | A1 * | 4/2015 | Krastev | B60K 16/00 |
| | | | | 244/2 |
| 2015/0136898 | A1 * | 5/2015 | McCoy | B64C 3/56 |
| | | | | 244/49 |

OTHER PUBLICATIONS

The Federal Aviation Administration, "Aircraft Landing Gear Systems", Aviation Maintenance Technician Handbook, 2012, vol. 1, Chapter 13, pp. 13-1, 13-5 to 13-22, and 13-30 to 13-34 (24 pages).

* cited by examiner

SUSPENSION FOR LANDING CONDITION

TECHNICAL FIELD

The present disclosure generally relates to an aerocar vehicle, and more particularly, to a suspension system for landing the aerocar vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

An aerocar vehicle, or roadable aircraft, may be defined as a vehicle that can be driven on roads in what may be referred to as a roadable mode, as well as takeoff, fly, and land as an aircraft in what may be referred to as a flight mode. Vehicles that demonstrate such capabilities are desirous because they can provide users with the freedom, comfort, and the ability to arrive quickly to a destination, all while the travel still remains private and personal. Such vehicles may require various tradeoffs to facilitate operations in both the roadable mode and the flight mode.

Numerous configurations of landing gear for aircrafts are known, and may largely be based on the arrangements commonly known as: tail wheel landing gear, tandem landing gear, and tricycle-type landing gear. In addition to supporting an aircraft during taxi on a runway, landing gears and their related structures may also control forces of impact on an aircraft during landing. An automobile suspension system may be designed to withstand forces of up to about two "G"s, for example, as it smooths out any bumps, potholes, or other minor irregularities in a road. Aircrafts, however, can be subjected to intense landings, and various sources suggest that their suspension systems should capable of tolerating at least double the amount forces, thus handling forces up to about four "G"s, or even higher.

Generally, aircraft landings transfer shock energy from landing gears of a suspension system throughout an airframe of an aircraft. The aircraft landing gears may also be used for absorbing (or converting) shock energy into heat energy.

Typical axles, wheel assemblies, and suspension systems for road vehicles generally do not need to capable of withstanding the same level of shock energy experienced by aircraft landing gear. However, it would be desirable to provide an improved suspension system for aerocars, such that they can be used for both ground (road) travel, and for flight landings.

SUMMARY

This section provides a general summary of the disclosure, and is not a comprehensive disclosure of its full scope or all of its features.

In various aspects, the present teachings provide an adjustable damping system for an aerocar suspension. The adjustable damping system may include a front suspension assembly and a rear suspension assembly. The adjustable damping system may include a conduit system providing a hydraulic fluid in fluid communication between the front suspension assembly and the rear suspension assembly. An auxiliary hydraulic fluid reservoir may be provided, coupled to the conduit system and configured to selectively maintain or interrupt fluid communication between the front suspension assembly and the rear suspension assembly to adjust damping of the front suspension assembly. A controller may be provided, configured to direct a flow of hydraulic fluid within the conduit system and the auxiliary hydraulic fluid reservoir. The operation of the controller may be based on the aerocar being in one of a roadable mode and a flight mode, and the flow of hydraulic fluid may be based on the rear suspension assembly receiving an impact force during a landing event.

In other aspects, the present teachings provide an aerocar with a dual mode suspension system. The aerocar may include a front suspension assembly having a front axle and at least one front wheel, and a rear suspension assembly having a rear axle and at least one rear wheel. The aerocar may include a conduit system providing a hydraulic fluid in fluid communication between the front suspension assembly and the rear suspension assembly. A controller may be provided, configured to change operation of the dual mode suspension system between a roadable mode and a flight mode. An auxiliary hydraulic fluid reservoir may be provided, coupled to the conduit system and configured to selectively maintain or interrupt fluid communication between the front suspension assembly and the rear suspension assembly in order to adjust the damping of the front suspension assembly. In certain aspects, the controller is configured to direct a flow of hydraulic fluid from the rear suspension assembly to the front suspension assembly. The control may be based on a stroke of the rear suspension assembly exceeding a predetermined value, for example, during a landing event.

In still other aspects, the present teachings provide a method for adjusting damping characteristics of a suspension system of an aerocar during a landing event. The method may include providing a conduit system in an aerocar, the conduit system including a hydraulic fluid in fluid communication between an auxiliary hydraulic fluid reservoir, a front suspension assembly, and a rear suspension assembly of the aerocar. The method may include selectively maintaining or interrupting the fluid communication between the front suspension assembly and the rear suspension assembly based on an operational mode of the aerocar. The method may include adjusting the damping characteristics of the front suspension assembly upon receiving a landing impact by the rear suspension assembly. In certain aspects, the adjustment of the damping characteristics increases the damping of the front suspension assembly in an amount proportional to an angle of descent of the aerocar during the landing event.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
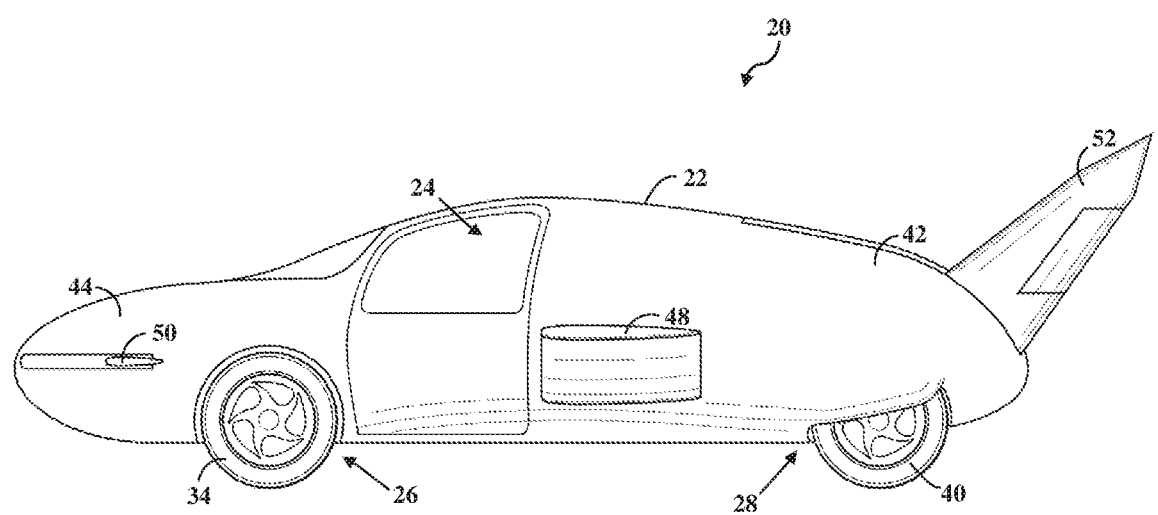
FIG. 1 is a side plan view of an aerocar according to various aspects of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides an aerocar with a dual mode suspension system. The dual mode suspension system may be configured to selectively operate in a roadable mode and a flight mode, and permits an adjustable damping system useful during landing events during the flight mode. As will be discussed in more detail below, the dual mode suspension system of the present technology may include a conduit system providing a hydraulic fluid in fluid communication between a front suspension assembly and a rear suspension assembly of an aerocar. An auxiliary hydraulic fluid reservoir may be provided in fluid communication with the conduit system, and configured to selectively maintain or interrupt fluid communication between the front suspension assembly and the rear suspension assembly to adjust damping of the front suspension assembly. For example, when the rear suspension is compressed based on movement of the rear wheel(s), the hydraulic fluid travels to the front suspension and the front wheels in order to increase the damping characteristics. In various aspects, a controller may be provided, configured to work with the auxiliary hydraulic fluid reservoir and selectively direct the flow of hydraulic fluid from the rear suspension assembly to the front suspension assembly upon a determination of the stroke of the rear suspension being greater than a predetermined value. The fluid communication may be interrupted during operation in a roadable mode, or when it may be otherwise desirable to maintain an independent suspension.

By way of context, a descent during air travel is where an aircraft decreases altitude, and is thus the opposite of an ascent or climbing event. Descents are part of normal air travel procedures, but may also unexpectedly occur during an emergency or weather event. Intentional descents might be undertaken to land, avoid other air traffic or undesirable flight conditions, etc. Generally, normal descents may take place at a constant airspeed and preferably at a constant angle of descent, or angle of final landing approach. For example, up until the final landing, an operator controls the angle of descent by varying engine power and pitch angle in an attempt to keep the airspeed constant. Unpowered descents, such as engine failure, may be steeper than powered descents.

During the landing of an aerocar, it may be desirable that the aerocar is tilted, for example, having an elevated nose with respect to the rear of the aerocar. In this tilted landing orientation, an aircraft is generally able to have a higher lift force at lower speeds. At the final landing stage, the rear landing gear of the aircraft makes contact with the ground, or runway, first, followed by the front landing gear. Similarly, with respect to an aerocar, the rear wheels and rear axle preferably contact the road/ground prior to the front wheels and front axle contact the road/ground. In this regard, an impact landing force may be greater at the front wheels and front axle than the rear wheels and rear axle, and may vary based on the angle of descent. For example, the higher the angle of descent, the higher the increase in impact force at the front suspension compared to that of the rear suspension.

The present technology provides systems and methods for managing the higher front impact landing force by providing increased damping at the front suspension assembly. The management may include adjusting the damping characteristics, for example, a damping level/ratio or wheel elevation, depending on an anticipated type of landing, a compression of the rear suspension, a stroke measurement of the rear suspension exceeding a predetermined value, or the like. It should be understood that while the present technology may be described with specific reference to use with angled descent landings, certain features may also be applicable to aerocars designed for short takeoff and landing (STOL).

FIG. 1 is a side plan view of an aerocar 20 according to various aspects of the present technology. The aerocar may operate in a roadable mode and a flight mode. As such, the aerocar 20 may include a dual mode suspension system, for example, a suspension system configured to alternatively and/or selectively operate in one of a flight mode and a roadable mode. It should be understood that while reference is made to a "dual" mode suspension system, there may also be additional use modes or manners of operation that ultimately include the use of the adjustable damping system of the present technology.

As used herein and as generally understood in the automotive and aircraft technology areas, damping is a process of absorbing energy of impacts transmitted through forks or springs on a compression and rebound stroke. Non-limiting examples of the components of damping or suspension systems may include springs, a set of forks, shocks, struts, and the like. Generally, the components work together as a system or assembly to slow a rate at which the suspension absorbs or releases energy. Dampers useful with the present technology can be any commonly used energy/shock absorber for use with an automobile, generally including hydraulic piston and rod combinations that can be tuned based on a level/amount of hydraulic fluid and pressure of the fluid. Damping is typically matched to a rate of a spring, aerocar and passenger/cargo weight, style of riding, and/or an intended type of suspension for the aerocar in a particular situation.

Figure 2:
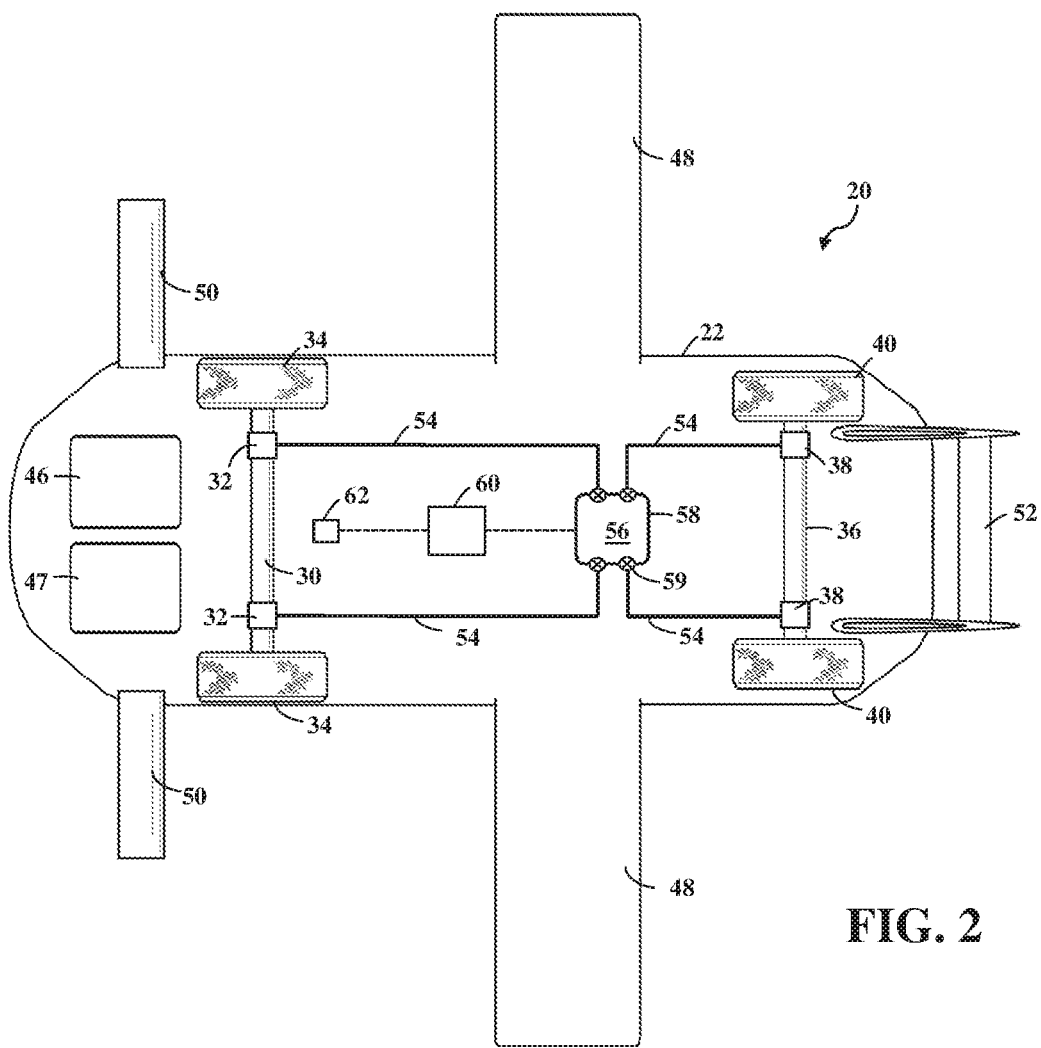
FIG. 2 is a schematic top view of the aerocar as shown in FIG. 1.

As shown, the aerocar 20 may include a body 22 with a passenger compartment 24 generally located between a front suspension assembly 26 and a rear suspension assembly 28. With reference to FIG. 2, which illustrates a schematic top view of the aerocar as shown in FIG. 1, the front suspension assembly 26 may include a front axle 30, at least one front damper 32, and at least one front wheel 34. The rear suspension assembly 28 may include a rear axle 36, at least one rear damper 38, and at least one rear wheel 40. The passenger compartment 24 generally includes seating (not specifically shown) and accompanying space for the operator/user and passengers of the aerocar 20, and may optionally include room for cargo, or have a separate cargo area 42.

The body 22 may include a separate engine compartment 44 to house a suitable power system 46 such as an internal combustion engine, or equivalent power generating unit. Processors or control equipment 47 may also be provided. The aerocar 20 may include a suitable wing system 48, canard assemblies 50, and an empennage system 52. It should be appreciated that although particular assemblies, systems, and subsystems may be separately defined herein for purposes of simplicity or clarity, it is contemplated that each or any of the subsystems may be combined or segregated, as desired or feasible.

The wing system 48, canard assemblies 50, and empennage system 52 may be at least partially stowable within various areas the body 22 of the aerocar 20 (not shown) in order to facilitate a low profile and stylish design potential when in the roadable mode, such that it does not interfere with the side and aft view for a driver/operator/user. In one example, a wingspan of about eighteen feet may be provided for a body 22 that is about six feet in width, with a takeoff weight of about 3,200 lbs. The power system 46 may operate to selectively power a set of drive wheels in the roadable mode, as well as a suitable propulsion system (not specifically shown) in the flight mode. It should be appreciated that various front-wheel drive, rear-wheel drive, all-wheel drive, and propulsion systems can be used with this technology. The power system 46 may be of various forms, including internal combustion, gas turbine, hybrid electric, fuel cells, and other energy conversion devices.

FIG. 2 is a schematic top view of the aerocar 20 as shown in FIG. 1. As illustrated, the aerocar 20 can include a conduit system 54 providing fluid communication for a hydraulic fluid 56 between a front damper 32 of the front suspension assembly 26 and a rear damper 38 of the rear suspension assembly 28. The conduit system 54 may include one or more tubes, pipes, or series of connections configured to provide a two-way transfer of hydraulic fluid from the rear suspension assembly 28 to the front suspension assembly 26.

In various aspects of the present technology, an auxiliary hydraulic fluid reservoir 58 is provided, coupled to the conduit system 54. Various valves 59 may also be provided throughout the conduit system 54, and may include shut-off valves, pressure valves, release valves, etc., connecting the conduit system 54 to the auxiliary hydraulic fluid reservoir 58. The auxiliary hydraulic fluid reservoir 58 should have a size, shape, and other design features such that it can store and transfer an appropriate amount of hydraulic fluid 56 sufficient to provide the increased damping characteristics of the front suspension assembly 26. It should be understood that the location of the conduit system 54 and the auxiliary hydraulic fluid reservoir 58 can vary based on aerocar design, and the specific locations shown in the appended figures are merely schematic views.

In various aspects, the auxiliary hydraulic fluid reservoir 58 may be configured to selectively maintain or interrupt fluid communication of hydraulic fluid 56 between respective dampers 32, 38 of the front suspension assembly 26 and the rear suspension assembly 28, to order to selectively adjust, e.g. increase or decrease, damping of the front suspension assembly 26. This may be accomplished through the use of various valves 59, as described above. For example, damping of the front suspension assembly 26 dampers 32 may be increased after an impact force is received by the rear suspension assembly 28. After landing, when in the roadable mode, the damping of the front dampers 32 may decrease back to their steady-state, or normal, driving levels.

In the roadable mode, the auxiliary hydraulic fluid reservoir 58 may be configured in a steady state manner, such that the force on the wheels is essentially zero. Thus, during normal driving conditions, the auxiliary hydraulic fluid reservoir 58 may be tuned to de-couple the front and rear suspension assemblies 26, 28. In certain examples, the auxiliary hydraulic fluid reservoir 58 may be provided with a sufficient gap, or air, in the system so that during normal ground operations, with stroke movements of up to about 80 mm at the front or rear axles 30, 36, fluid is not compressed within the conduit system 54, and accordingly, damping adjustments are not made to the dampers 32, 38.

As shown in FIG. 2, in various aspects, a controller 60 may be provided, coupled to various components of the dual mode suspension system. In various aspects, the controller may be configured to switch modes between roadable and flight modes. The controller 60 may include a manual controller, such as a manually actuated device/mechanism 62 engaged by a user/operator, and/or the controller 60 may include a processor or computing unit configured for automated engagement. For example, the controller 60 may include a computing device, for example, for use within a vehicle. The computing device can be any type of vehicle-installed, handheld, or other form of single computing device, or can be composed of multiple computing devices. The processing unit in the computing device can be a conventional central processing unit (CPU) or any other type of device, or multiple devices, capable of manipulating or processing information. A memory in the computing device can be a random access memory device (RAM) or any other suitable type of storage device. The memory can include data that is accessed by the CPU using a bus. The memory can also include an operating system and installed applications, the installed applications including programs that permit the CPU to perform the control methods described herein. The computing device can also include secondary, additional, or external storage, for example, a memory card, flash drive, or any other form of computer readable medium. The installed applications can be stored in whole or in part in the external storage and loaded into the memory as needed for processing.

In various aspects, at least one of the auxiliary hydraulic fluid reservoir 58 and the controller 60 is configured to selectively direct a flow of hydraulic fluid 56 within the conduit system 54 and through various ports in communication with the auxiliary hydraulic fluid reservoir 58. In certain aspects, the operation of the controller may be based on the aerocar being in one of a roadable mode and a flight mode. For example, in a roadable mode, the controller may interrupt fluid communication between the front suspension assembly and the rear suspension assembly. In a flight mode, the controller may maintain fluid communication between the front suspension assembly and the rear suspension assembly in order to adjust damping of the front suspension assembly after an impact force is received by the rear suspension assembly.

In various aspects, at least one of the controller 60 and the auxiliary hydraulic fluid reservoir 58 may be configured to direct the flow of hydraulic fluid from the rear suspension assembly to the front suspension assembly when a stroke of the rear suspension assembly exceeds a predetermined value. For example, the controller 60 may be configured to direct the flow of hydraulic fluid from the rear suspension assembly to the front suspension assembly when a stroke of the rear suspension assembly is greater than about 80 mm. In certain aspects, a stroke greater than about 80 mm may indicate a landing event.

In various other aspects, at least one of the controller 60 and the auxiliary hydraulic fluid reservoir 58 may be configured to increase an amount of damping of the front suspension assembly in a manner proportional to an angle of descent of a landing aerocar. For example, upon a determination that the angle of approach is between about 3 and about 15 degrees. Generally, the higher the angle of approach, the greater the increase in damping is provided in order to absorb the increased impact force of the front wheels. It should be understood that other correlations, including direct and indirect correlations, may also be used to increase the amount of damping.

Figure 3A:
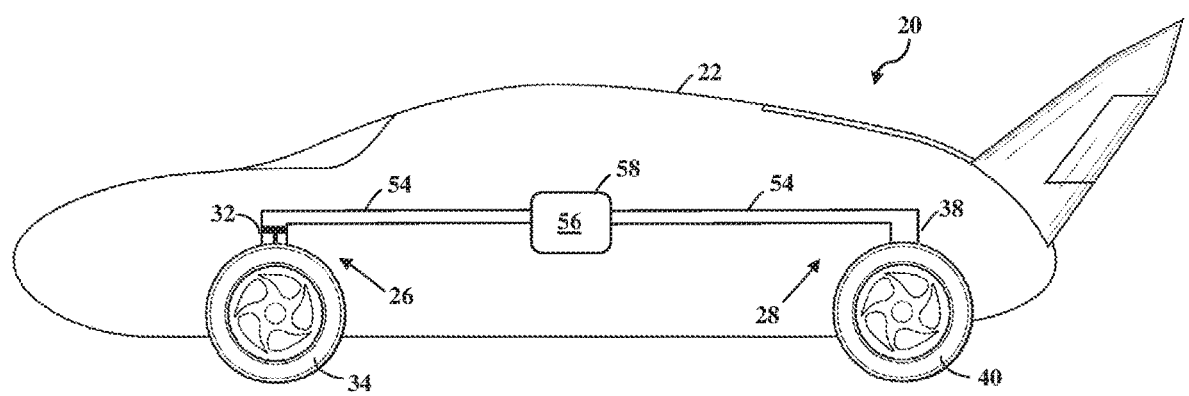
FIGS. 3A and 3B are schematic side views of the aerocar as shown in FIG. 1, showing aspects of variable damping of a coupled suspension system according to various aspects of the present technology.
Figure 3B:
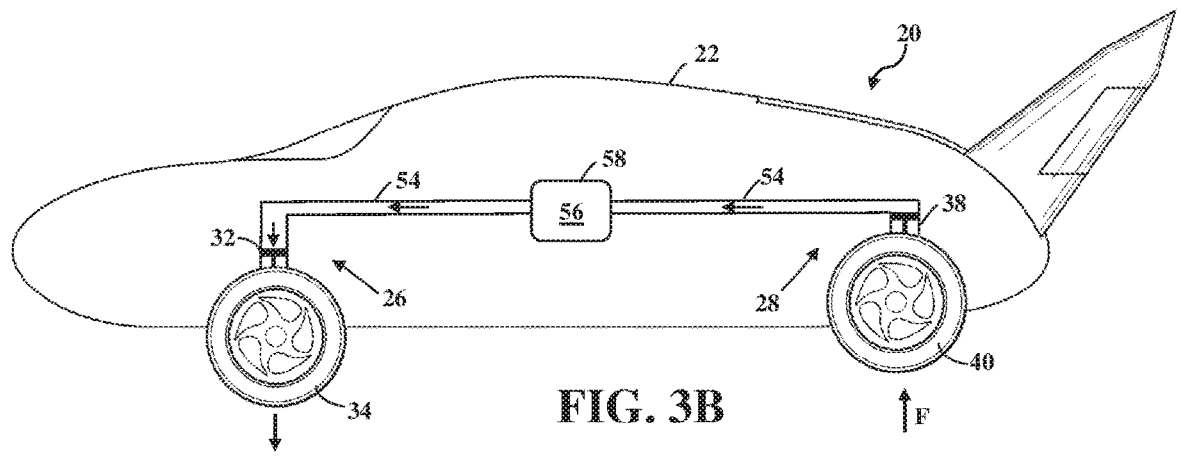

FIGS. 3A and 3B are schematic side views of the aerocar 20 as shown in FIG. 1, showing aspects of variable damping of a coupled suspension system according to various aspects of the present technology. FIG. 3A illustrates the aerocar 20 in a roadable mode, wherein the front and rear suspension assemblies 26, 28 are in a steady state and no additional forces are applied. FIG. 3B illustrates the aerocar 20 in a flight mode. When the rear wheel 40 is compressed as shown in FIG. 3B, the hydraulic fluid resistance increases, and hydraulic fluid 56 is forced through the auxiliary hydraulic fluid reservoir 58 and the conduit system 54 to the front damper 32 (as indicated by the arrows), in turn, increasing the damping of the front suspension assembly 26 and optionally extending the front wheel 34 to allow for a larger stroke for the front wheel 34 hitting the road or runway.

Figure 4A:
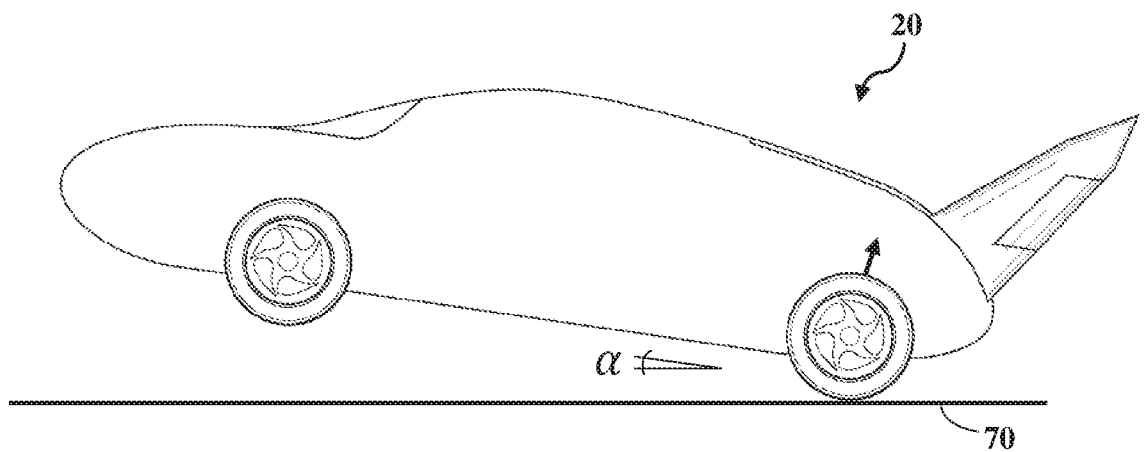
FIGS. 4A, 4B, and 4C illustrate a landing sequence of an aerocar landing at an angle of descent, with changes in the damping characteristics or suspension system during the landing event.
Figure 4B:
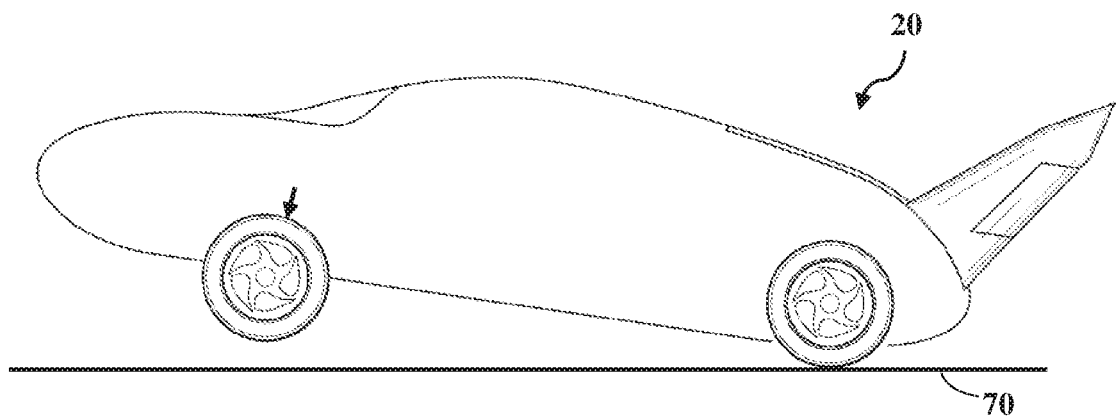
Figure 4C:
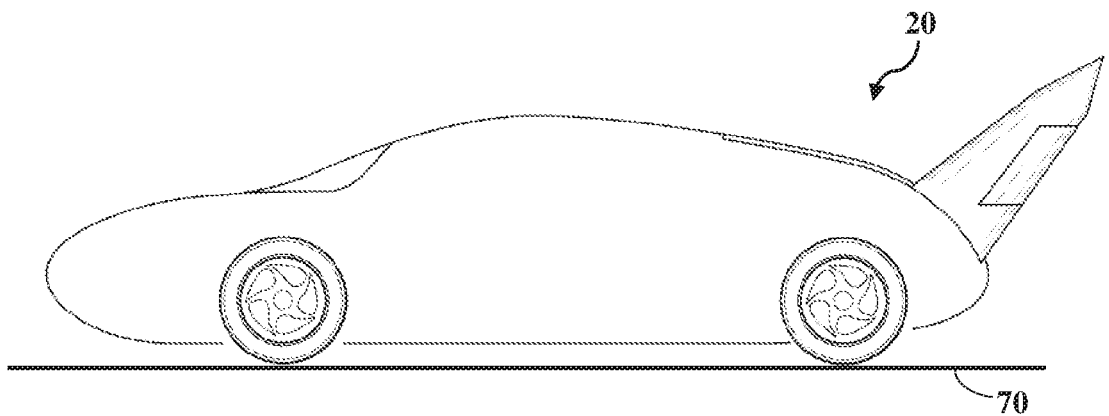

FIGS. 4A, 4B, and 4C illustrate a landing sequence of an aerocar 20 landing at an angle of descent, with changes in the damping characteristics or suspension system during the landing event. FIG. 4A illustrates the rear wheel 40 making first contact with a road or runway 70 at an angle of descent a. The impact force of hitting the road or runway 70 is transferred to the rear suspension assembly 28 and rear damper 38, and the rear wheel 40 may travel in an upward (raised) direction. The compression and related transfer of hydraulic fluid preferably increases the damping characteristics of the front suspension assembly 26 and front damper 32, and the front wheel 34 may be in an extended (lowered) position as shown in FIG. 4B. Immediately upon landing, both the front and rear wheels 34, 40 may be in a raised position as shown in FIG. 4C, and can be subsequently lowered (raising the aerocar) when the landing event is over and the aerocar switches back to a roadable mode of operation.

The present technology also provides methods for adjusting damping characteristics of a suspension system of an aerocar during a landing event. The method may include providing a conduit system 54 in an aerocar 20, the conduit system 54 including a hydraulic fluid 56 in fluid communication between an auxiliary hydraulic fluid reservoir 58, a front suspension assembly 26, and a rear suspension assembly 28 of the aerocar 20. The method may include selectively maintaining or interrupting the fluid communication between the front suspension assembly 26 and the rear suspension assembly 28 based on an operational mode of the aerocar, for example, interrupting the fluid communication during a roadable mode and maintaining the fluid communication during a flight mode. The method may include adjusting the damping characteristics of the front suspension assembly 26 upon receiving a landing impact by the rear suspension assembly 28, as described above. In certain aspects, the adjustment of the damping characteristics increases the damping of the front suspension assembly 26 in an amount proportional to an angle of descent of the aerocar during the landing event. The higher the angle of descent, the higher the level of increased damping.

In various aspects, the method may also include a step of determining a stroke value of the rear suspension assembly upon receiving the landing impact. The stroke value may be related to a pressure increase in hydraulic fluid. The conduit system and auxiliary hydraulic fluid reservoir may be provided with pressure valves or regulators, configured to transfer fluid upon a predetermined condition. In certain aspects, the auxiliary hydraulic fluid reservoir 58 may be configured to increase damping of the front suspension assembly when a stroke of the rear suspension assembly exceeds a predetermined value.

In one example, certain valves of the auxiliary hydraulic fluid reservoir 58 may be configured to increase damping of the front suspension assembly based on a pressure of the hydraulic fluid. The pressure may be related to a measurable stroke movement. In various aspects, it may be desirable to begin a damping adjustment after the stroke of the rear suspension assembly is greater than about 80 mm, which is often needed for normal road operation. It should be understood that the specific stroke value can change based on the type of vehicle and weight of the vehicle.

Figure 5:
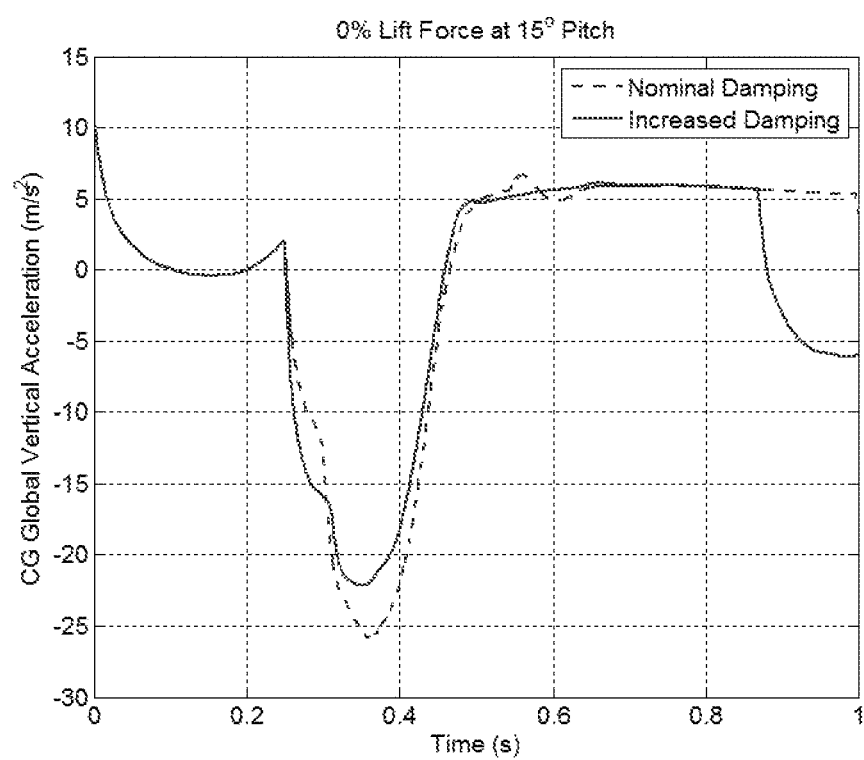
FIG. 5 is a graphical illustration of a landing simulation based on an aerocar provided with the coupled suspension system according to various aspects of the present technology.

FIG. 5 is a graphical illustration of a landing simulation based on an aerocar provided with the coupled suspension system according to various aspects of the present technology. This particular landing simulation is performed for a 0% lift force at a fifteen (15) degree pitch, or angle of descent. Landing simulation results, such as that shown in the exemplary graph in FIG. 5, confirm that vertical acceleration experienced during landing is reduced by approximately 15%. Similar results are obtained at a 67% lift, preventing the suspension from bottoming out.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. An adjustable damping system for an aerocar, the aerocar including a wing system, the aerocar being configured to operate in a roadable mode and a flight mode, the adjustable damping system comprising:
    a front suspension assembly;
    a rear suspension assembly;
    a conduit system providing a hydraulic fluid in fluid communication between the front suspension assembly and the rear suspension assembly;
    an auxiliary hydraulic fluid reservoir coupled to the conduit system and configured to selectively maintain or interrupt fluid communication between the front suspension assembly and the rear suspension assembly to adjust damping of the front suspension assembly after a landing impact force is received by the rear suspension assembly; and
    a controller configured to direct a flow of hydraulic fluid within the conduit system and the auxiliary hydraulic fluid reservoir, wherein operation of the controller is based on the aerocar being in one of the roadable mode and the flight mode.

2. The adjustable damping system of claim 1, wherein at least one of the controller and the auxiliary hydraulic fluid reservoir is configured to direct the flow of hydraulic fluid from the rear suspension assembly to the front suspension assembly when a stroke of the rear suspension assembly exceeds a predetermined value, whereby the predetermined value is indicative of the landing impact force.

3. An adjustable damping system for an aerocar, the aerocar being configured to operate in a roadable mode and a flight mode, the adjustable damping system comprising:
    a front suspension assembly;
    a rear suspension assembly;
    a conduit system providing a hydraulic fluid in fluid communication between the front suspension assembly and the rear suspension assembly;
    an auxiliary hydraulic fluid reservoir coupled to the conduit system and configured to selectively maintain or interrupt fluid communication between the front suspension assembly and the rear suspension assembly to adjust damping of the front suspension assembly after a landing impact force is received by the rear suspension assembly; and
    a controller configured to direct a flow of hydraulic fluid within the conduit system and the auxiliary hydraulic fluid reservoir, wherein operation of the controller is based on the aerocar being in one of the roadable mode and the flight mode,
    at least one of the controller and the auxiliary hydraulic fluid reservoir being configured to increase an amount of damping of the front suspension assembly in a manner proportional to an angle of descent of a landing aerocar, whereby the landing impact force varies based on the angle of descent.

4. The adjustable damping system of claim 3, wherein the angle of descent is between substantially 3 and substantially 15 degrees.

5. The adjustable damping system of claim 1, wherein the rear suspension assembly is configured to compress upon receiving the landing impact force, thereby directing a flow of hydraulic fluid to the front suspension assembly.

6. The adjustable damping system of claim 1, wherein the auxiliary hydraulic fluid reservoir is configured to interrupt a flow of hydraulic fluid from the rear suspension assembly to the front suspension assembly during operation of the aerocar in the roadable mode.

7. The adjustable damping system of claim 1, wherein the front suspension assembly comprises a pair of front wheels and a pair of front dampers, and the rear suspension assembly comprises a pair of rear wheels and a pair of rear dampers, and a damping adjustment is equally applied to each front damper.

8. An aerocar with a dual mode suspension system, the aerocar being configured to operate in a roadable mode and a flight mode, the aerocar comprising:
    a wing system;
    a front suspension assembly having a front axle and at least one front wheel;
    a rear suspension assembly having a rear axle and at least one rear wheel;
    a conduit system providing a hydraulic fluid in fluid communication between the front suspension assembly and the rear suspension assembly;
    a controller configured to change operation of the dual mode suspension system based on the aerocar being in one of the roadable mode and the flight mode; and
    an auxiliary hydraulic fluid reservoir coupled to the conduit system and configured to selectively maintain or interrupt fluid communication between the front suspension assembly and the rear suspension assembly in order to adjust damping of the front suspension assembly,
    the rear suspension assembly being configured to compress upon receiving a landing impact force, thereby directing a flow of hydraulic fluid to the front suspension assembly.

9. The aerocar of claim 8, wherein the controller is configured to direct a flow of hydraulic fluid within the conduit system and the auxiliary hydraulic fluid reservoir.

10. The aerocar of claim 9, wherein at least one of the controller and the auxiliary hydraulic fluid reservoir is configured to direct the flow of hydraulic fluid from the rear suspension assembly to the front suspension assembly when a stroke of the rear suspension assembly exceeds a predetermined value.

11. An aerocar with a dual mode suspension system, the aerocar comprising:
    a front suspension assembly having a front axle and at least one front wheel;
    a rear suspension assembly having a rear axle and at least one rear wheel;

a conduit system providing a hydraulic fluid in fluid communication between the front suspension assembly and the rear suspension assembly;

a controller configured to change operation of the dual mode suspension system between a roadable mode and a flight mode; and an auxiliary hydraulic fluid reservoir coupled to the conduit system and configured to selectively maintain or interrupt fluid communication between the front suspension assembly and the rear suspension assembly in order to adjust damping of the front suspension assembly, the controller being configured to direct a flow of hydraulic fluid within the conduit system and the auxiliary hydraulic fluid reservoir, and at least one of the controller and the auxiliary hydraulic fluid reservoir being configured to increase an amount of damping of the front axle in a manner proportional to an angle of descent of a landing aerocar.

12. The aerocar of claim 11, wherein the angle of descent is between substantially 3 and substantially 15 degrees.

13. The aerocar of claim 9, wherein at least one of the controller and the auxiliary hydraulic fluid reservoir is configured to interrupt a flow of hydraulic fluid from the rear suspension assembly to the front suspension assembly during operation of the aerocar in the roadable mode.

14. A method for adjusting damping characteristics of a suspension system of an aerocar during a landing event, the aerocar being configured to operate in a plurality of operational modes including a roadable mode and a flight mode, the aerocar including a wing system, a conduit system in the aerocar including a hydraulic fluid in fluid communication between an auxiliary hydraulic fluid reservoir, a front suspension assembly, and a rear suspension assembly of the aerocar, the method comprising:

selectively maintaining or interrupting the fluid communication between the front suspension assembly and the rear suspension assembly based on the operational mode of the aerocar; and adjusting damping characteristics of the front suspension assembly upon receiving a landing impact by the rear suspension assembly during the landing event.

15. A method for adjusting damping characteristics of a suspension system of an aerocar during a landing event, a conduit system in the aerocar including a hydraulic fluid in fluid communication between an auxiliary hydraulic fluid reservoir, a front suspension assembly, and a rear suspension assembly of the aerocar, the method comprising:

selectively maintaining or interrupting the fluid communication between the front suspension assembly and the rear suspension assembly based on an operational mode of the aerocar; and adjusting damping characteristics of the front suspension assembly upon receiving a landing impact by the rear suspension assembly, wherein adjusting damping characteristics comprises increasing damping of the front suspension assembly in an amount proportional to an angle of descent of the aerocar during landing, whereby the landing impact varies based on the angle of descent.

16. The method according to claim 15, wherein the angle of descent is between substantially 3 and substantially 15 degrees.

17. The method according to claim 14, further comprising measuring a stroke value of the rear suspension assembly upon receiving the landing impact, wherein the auxiliary hydraulic fluid reservoir is configured to increase damping of the front suspension assembly when a stroke of the rear suspension assembly exceeds a predetermined value.

18. The method according to claim 17, wherein the auxiliary hydraulic fluid reservoir is configured to increase damping of the front suspension assembly when the stroke of the rear suspension assembly is greater than substantially 80 mm.

* * * * *